(12) United States Patent
Lundahl

(10) Patent No.: US 7,270,318 B2
(45) Date of Patent: Sep. 18, 2007

(54) DEVICE AT AN ENERGY ACCUMULATING PISTON-CYLINDER TOOL

(75) Inventor: Leif Lundahl, Nobble (SE)

(73) Assignee: Stromsholmen AB, Tranas (SE)

(*) Notice: Subject to any disclaimer, the term of this patent is extended or adjusted under 35 U.S.C. 154(b) by 0 days.

(21) Appl. No.: 10/250,710

(22) PCT Filed: Nov. 11, 2002

(86) PCT No.: PCT/SE02/02047
§ 371 (c)(1),
(2), (4) Date: Dec. 22, 2003

(87) PCT Pub. No.: WO03/042571
PCT Pub. Date: May 22, 2003

(65) Prior Publication Data
US 2004/0113336 A1 Jun. 17, 2004

(30) Foreign Application Priority Data
Nov. 12, 2001 (SE) .............................. 0103757

(51) Int. Cl.
F16F 9/32 (2006.01)
F16F 9/43 (2006.01)

(52) U.S. Cl. ........................ 267/119; 303/87; 138/30; 138/31

(58) Field of Classification Search .............. 138/30, 138/31; 303/87; 267/113, 119
See application file for complete search history.

(56) References Cited

U.S. PATENT DOCUMENTS

| | | | | |
|---|---|---|---|---|
| 2,695,037 A | * | 11/1954 | McCuistion | ................ 138/31 |
| 2,747,370 A | * | 5/1956 | Traut | ............................. 138/31 |
| 2,748,801 A | * | 6/1956 | McCuistion | ................. 138/31 |
| 3,074,437 A | * | 1/1963 | Mercier | ........................ 138/31 |
| 3,625,540 A | * | 12/1971 | Jewell David E. | ........... 280/159 |
| 3,736,645 A | * | 6/1973 | Fannin et al. | ................... 29/422 |
| 3,801,147 A | * | 4/1974 | Barrell et al. | |
| 4,124,087 A | | 11/1978 | Bortfeld | ....................... 180/274 |
| 4,426,109 A | | 1/1984 | Fike, Jr. | |
| 4,765,227 A | | 8/1988 | Balazs et al. | .............. 91/417 R |
| 4,915,363 A | | 4/1990 | Prozeller et al. | .......... 267/64.15 |

FOREIGN PATENT DOCUMENTS

| | | |
|---|---|---|
| DE | 199 53 901 A1 | 7/2001 |
| EP | 1 419 016 | 12/1975 |
| EP | 0 427 468 A1 | 5/1991 |
| EP | 0 959 263 A1 * | 11/1999 |

* cited by examiner

Primary Examiner—Melody M. Burch
(74) Attorney, Agent, or Firm—Fay, Sharpe LLP; Brian E. Turung

(57) ABSTRACT

The present invention relates to an arrangement in an energy-accumulating piston-cylinder device (1, 2) having a piston (2) and a cylindrical casing (1). The invention is characterized by an openable safety valve (1) arranged in the piston (2) and/or a discharge duct (11) together with an element (8; 17) arranged on the cylindrical casing (1) or the safety valve (10) and in the cylinder chamber, which element is designed, in the event of the piston (2) being inserted into the cylinder chamber by more than a predetermined distance, to act upon the safety valve/the discharge duct (10, 11) in order to expose the said duct (11), permitting a discharge of the pressure in the cylinder chamber.

9 Claims, 3 Drawing Sheets

DEVICE AT AN ENERGY ACCUMULATING PISTON-CYLINDER TOOL

The present invention relates to an arrangement in an energy-accumulating piston-cylinder device, also called a gas-filled spring, having a piston and a cylindrical casing. The invention is characterized by a safety valve arranged in the piston, a discharge duct, and an element deigned, in the event of the piston being inserted into the cylinder chamber by more than a predetermined distance, to act upon the safety valve/discharge duct, permitting a discharge of the pressure in the cylinder chamber.

Piston-cylinder devices in the form of gas-filled springs are provided in a sheet metal press, for example, in which their function is, among other things, to hold the sheet metal during the forming processing and to separate the tool halves when sheet metal forming has been carried out. Gas-filled springs are therefore used to support the sheet metal holder. They are subjected to pressure at the beginning of the pressing process and relieved of pressure on the completion of sheet metal forming when the press slide and the press upper part are moved upwards. To what extent the gas-filled springs are subjected to loading is determined by the pressing process, by the appearance of the pressed sheet metal part and by the stroke length used in the gas-filled springs. Even if the gas-filled springs are selected according to the appearance arid shape of the pressed sheet metal part, with the aim of achieving full control of the press cycle, there is a risk that the press cycle cannot be controlled entirely satisfactorily. Overloading of the gas-filled springs in the event of an excessively long stroke exceeding their defined nominal stroke length may therefore have a detrimental effect on the gas-filled springs. Such overloading may sooner or later cause damage to the tubular casing of the gas-filled springs, which leads to a reduced service life and also impairs their reliability through uncontrolled leakage and/or uncontrolled movement of the piston and piston rod part of the gas-filled springs. There is therefore a need to be able to discharge the pressure in a gas-filled spring, for example after performing an excessively long stroke in a sheet metal press.

EP-A-0 959 263 discloses a safety valve for discharging the gas pressure in a gas-filled spring arrangement. The said safety valve is located at the bottom of the cylindrical casing, that is to say in the part of the piston-cylinder arrangement that is located in a recess in the actual press tool suited to this purpose. The piston is designed to be capable of impinging on this safety valve in the event of an excessively long stroke and of opening the said valve in order to expose a passage between cylindrical chamber and the external surroundings. By placing the safety valve at the bottom of the cylinder casing, which is often located in a recess in the tool half, there is a risk that discharge of the gas pressure will be prevented or impeded. Special ducts may need to be formed in the tool in order to permit or ensure a discharge of the gas pressure from the cylinder chamber.

Reference is also made to U.S. Pat. No. 4,426,109 A and GB 1419016 A as examples of the prior art.

The object of the present invention is to provide an improved arrangement in a piston-cylinder arrangement which in the event of possible damage to the tubular casing of the piston-cylinder arrangement, for example in the case of an excessively long press stroke, facilitates a controlled discharge of the gas pressure in the cylinder chamber.

The stated object of the invention is achieved in that the arrangement has the characteristics specified in the patent claims.

Locating the discharge opening centrally in the piston need not significantly weaken the latter and at the same time provides an optimal flow path for the desired gas discharge.

The invention will now be described in more detail with reference to examples of embodiments shown in the drawings attached, in which.

Figure 1:
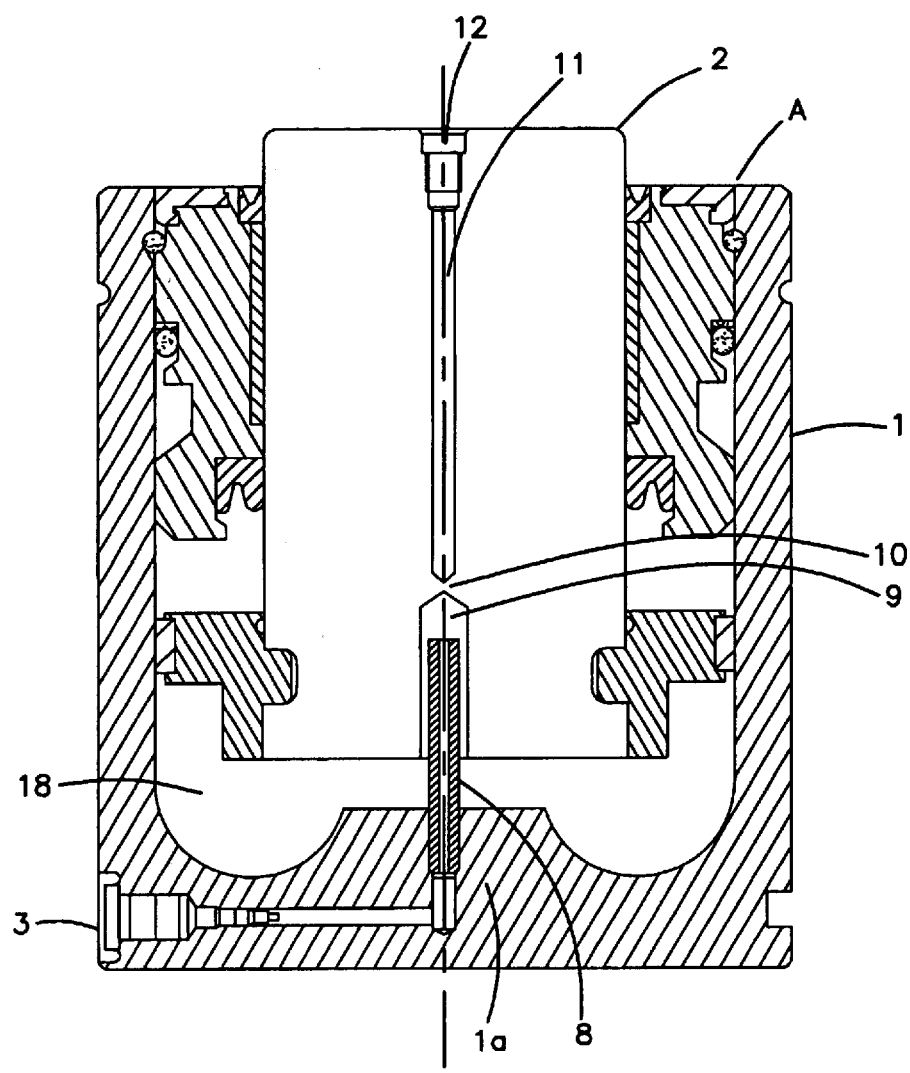
FIG. 1 shows a section through a piston-cylinder arrangement in a normal, that is to say a permitted working position between piston and cylinder.

FIG. 1 shows the piston 2 in a normal projecting position, that is to say at a distance from a pin 8 arranged at the bottom of the cylindrical casing. The said pin 8 extends into an open recess 9 in the piston 2 and is directed towards a breakable material bridge or safety valve 10 in such a way that, should a predetermined maximum insertion of the piston 2 in the cylinder arrangement 1 and/or maximum force acting on the piston be exceeded—see FIG. 2—the pin 8 will impinge on the material bridge or the safety valve 10 and open this in order to permit a discharge of the gas pressure in the chamber of the cylinder arrangement 1. In this way the gas will be able to flow out at the top of the piston-cylinder arrangement and be directed away from a lower tool half (not shown) in which the piston-cylinder arrangement is fitted, that is to say in a more reliable way, particularly when an upper tool half (not shown) has been moved away from the lower tool half and from the sheet metal holder. The upper tool half will then be able to act as a shield or protection to prevent the possibility of personnel being exposed to the action of an instantaneously high and risky discharge of the gas and fluid flow.

Figure 2:
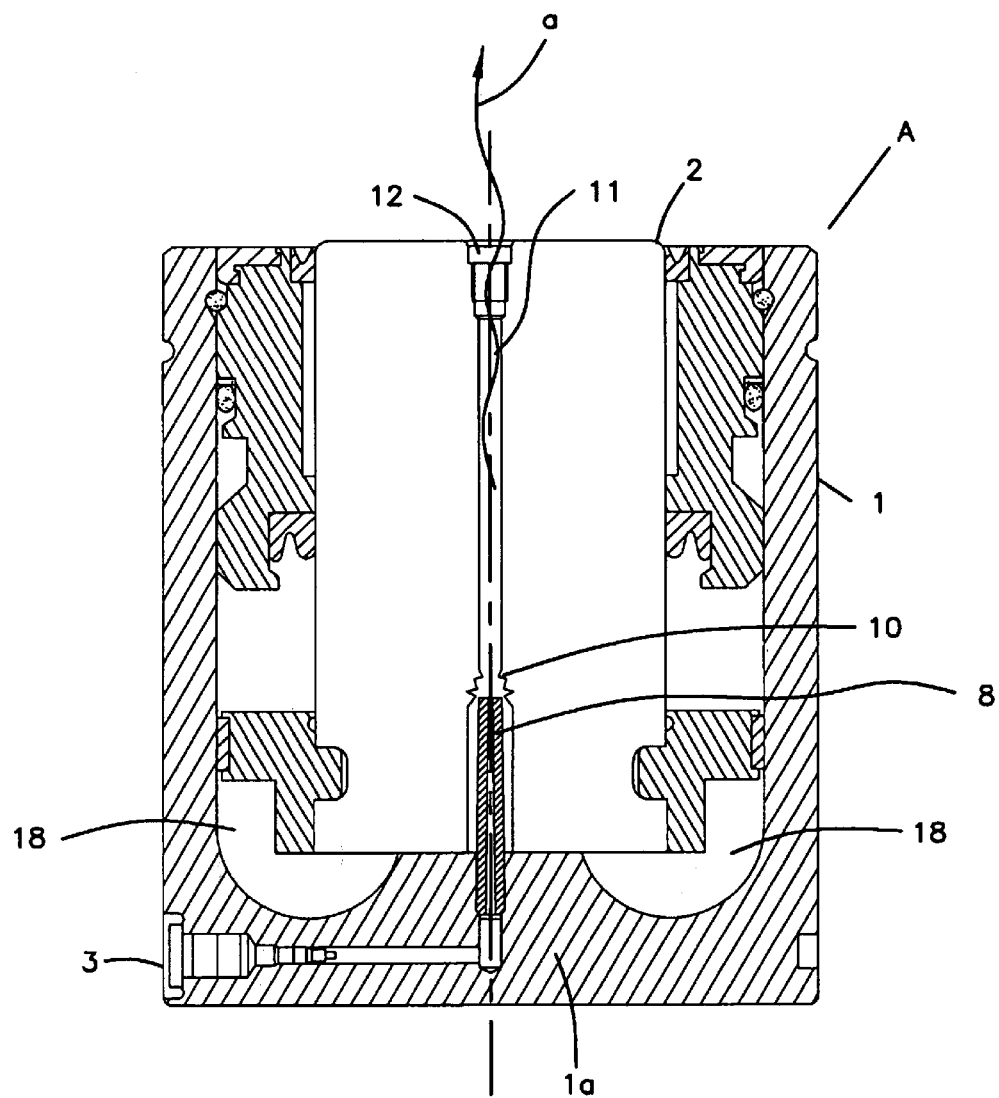
FIG. 2 shows a corresponding section through the piston-cylinder arrangement according to FIG. 1, where the piston-cylinder arrangement is in a piston-overrun stroke and in a cylinder chamber pressure-discharging position.

FIGS. 1 and 2 also show a material-catching cover 12 or shield on the upper part of a duct 11 accommodated in the piston/piston rod part 12. This cover or shield catches any material detached from the broken material bridge or the safety valve 10. The cover 12 may also have an indicator function, that is to say an adjustable or otherwise actuatable part which is made by hydraulic pressure to assume an indicating position.

Figure 3:
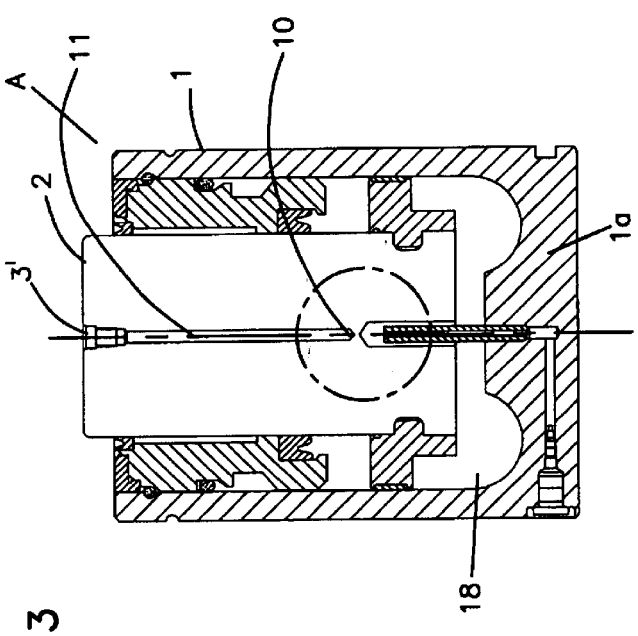
FIG. 3 and FIG. 3A, FIG. 3B and FIG. 3C show alternative variants of the breakable or activatable material bridge/safety valve.

FIG. 3 shows a variant of the material bridge/safety valve that has been fully integrated into the piston 2 together with a filling duct and in which a non-return valve may permit charging of the piston-cylinder arrangement A via the duct 11 and the filling valve 3'. In this embodiment the casing part of the arrangement A is kept intact in such a way that any ducts weakening the casing part of the arrangement are not incorporated.

Figure 3C:
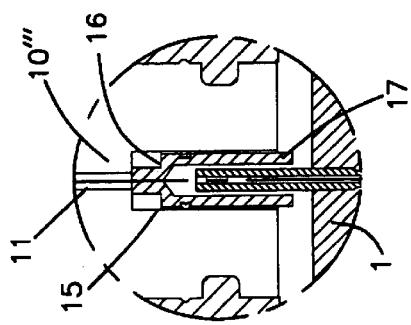
Figure 3A:
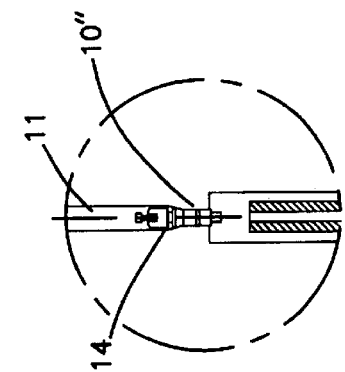

FIG. 3A shows an activatable safety valve 10'/stopper screwed in by means of threads 13, that is to say a part which after triggering can simply be replaced with a new part, provided that other no other damage to the gas-filled spring has occurred.

Figure 3B:
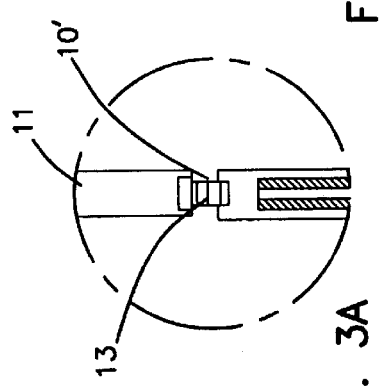

FIG. 3B shows a safety valve 10", which has a double function in that during the first phase of an excessively long stroke it merely lifts the safety valve from a seat 14 for discharging the gas pressure; only in a second phase does it permanently deform or remove parts of the safety valve, thereby rendering the gas-filled spring permanently unusable.

FIG. 3C shows yet another variant of the safety valve according to the invention in which the safety valve 10''' comprises an insert 15 with a fracture mark 16 arranged in the piston 2, and a part 17 projecting towards the bottom of the cylindrical casing 1. When the piston part 2 moves too far down towards the bottom of the cylindrical casing, therefore, the projecting part 17 situated in the safety valve 10' will force the insert 15 up and will break the fracture mark 16 thereby freeing the duct 11 for discharging the gas pressure.

In certain applications it is desirable to have the facility for showing the degree or magnitude of an excessively long stroke covered by the piston/piston rod in the gas-filled spring, or for simply indicating that an excessively long stroke has occurred. Such indication can be provided in various ways and in itself forms no part of the invention, the person skilled in the art being able to provide such indicating action according to needs and requirements.

The invention is not limited to the examples of embodiments described above but lends itself to modifications within the scope of the patent claims specified below.

What is claimed is:

1. An energy-accumulating piston-cylinder device comprising:
    a pistons, displaceable in a cylinder under the effect of pressure,
    a fluid-filled chamber, defined between the piston and the cyinder,
    a duct passing axially through the piston, providing a connection between the fluid-filled chamber and an open surrounding environment outside of the piston-cylinder device,
    a sealing part to prevent communication through the duct between the fluid- filled chamber and the open surrounding environment, and
    a pin element for interaction with the sealing part,
    wherein the sealing part and duct from a safety valve, which is arranged to relieve the pressure in the fluid-filled chamber when the piston, under the effect of pressure in excess of a predetermined valve, is inserted to a predetermined position in the cylinder, and
    wherein the pin element is arranged to act upon the sealing part when the piston is inserted to the predetermined position, to establish a discharge route via the duct between the chamber and the open surrounding environment.

2. The energy-accumulating piston-cylinder device is claimed in claim 1, wherein the pin element comprises a tube extending from a bottom of the cylinder and is directed towards the duct in the piston, wherein the tube is connected to a filling valve of the piston-cylinder device.

3. The energy-accumulating piston-cylinder device is claimed in claim 1, wherein the pin element extends from the sealing part toward a bottom of the cylinder.

4. The energy-accumulating pisto-cylinder device as claimed in claim 1, wherein the sealing part is breakable.

5. The energy-accumulating piston-cylinder device is claimed in claim 4, wherein the sealing part comprises a material bridge.

6. The energy-accumulating piston-cylinder device as claimed in claim 4, wherein the sealing part comprises an insert arranged in the piston and having a fracture mark.

7. The energy-accumulating piston-cynder device as claimed in claim 1, wherein the sealing part is an openable and closable valve arrangement, which is actuatable by the pin element.

8. The energy-accumulating piston-cylinder device as claimed in claim 1, wherein the sealing part is designed to return to the closed position when no longer acted upon by the pin element.

9. The energy-accumulating piston-cylinder device as claimed in claim 1, further comprising means for indicating an established communication in the duct.

* * * * *